United States Patent [19]

Abe et al.

[11] 3,943,190

[45] Mar. 9, 1976

[54] PROCESS FOR PREPARING ACRYLATE POLYMERS

[75] Inventors: Takeaki Abe, Yokohama; Masaharu Horikawa, Ayase; Jiro Kurita, Yokohama, all of Japan

[73] Assignee: Asahi Kasei Kogyo Kabushiki Kaisha, Osaka, Japan

[22] Filed: July 30, 1974

[21] Appl. No.: 493,646

[30] Foreign Application Priority Data

Aug. 15, 1973 Japan.............................. 48-90858

[52] U.S. Cl.......... 260/876 R; 260/31.2 R; 260/885
[51] Int. Cl.².................... C08F 6/24; C08F 265/06
[58] Field of Search......... 260/86.1 R, 86.1 E, 86.3, 260/876 R, 885, 875

[56] References Cited
UNITED STATES PATENTS

| | | | |
|---|---|---|---|
| 3,745,196 | 7/1973 | Lane et al............................ | 260/881 |
| 3,833,686 | 9/1974 | Grochowski et al............ | 260/876 R |

Primary Examiner—John Kight, III
Attorney, Agent, or Firm—Armstrong, Nikaido & Wegner

[57] ABSTRACT

A process for preparing arcylate polymers comprising subjecting to suspension-polymerization a system (I) comprising an alkyl ester of methacrylic acid, said system (I) optionally containing an alkyl ester of acrylic acid and other vinyl monomer copolymerizable with said esters, to obtain a suspension containing polymer beads; and adding to the resulting suspension an aqueous suspension of a system (II) comprising an alkyl ester of acrylic acid and a cross-linking monomer, said system (II) optionally containing an alkyl ester of methacrylic acid and being employed in an amount of 20 to 70 parts by weight per 100 parts by weight of said system (I), under agitation at a temperature allowing substantial advance of polymerization to effect a final polymerization. The polymers obtained by the process are excellent in both the weather resistance and impact resistance, which are suitable for formation of molded products having excellent properties, especially, suitable for formation of films having a beautiful lustrous surface and excellent mechanical properties.

10 Claims, No Drawings

PROCESS FOR PREPARING ACRYLATE POLYMERS

This invention relates to a process for preparing acrylate polymers having an impact resistance by suspension polymerization. Polymers prepared according to the process of this invention are suitable especially for production of films, and they can readily be molded into films by the inflation molding method or T-die molding method using ordinary extruders. Further, polymers prepared according to this invention can be injection-molded or extrusion-molded, and each of molded products has high weather resistnce which is a characteristic property inherent of an acrylate type polymer. Still further, polymers obtained according to the process of this invention may be blended with other polymers inferior in weather resistance and impact resistance, such as polyvinyl chloride, so that the properties of those inferior polymers are improved.

Polymers of methacrylic acid esters have, in general, excellent weather resistance and they are applied conveniently to outdoor uses, but their mechanical properties are poor. More specifically, they are defective in that they are brittle and are easily broken under impact.

Accordingly, many attempts have heretofore been made to provide polymer resins of methacrylic acid esters which have an improved impact resistance while retaining the high weather resistance. For example, there has been proposed a process comprising preparing fine particles of an unsaturated bond-containing elastomer such as polybutadiene by emulsion polymerization and graft-copolymerizing the elastomer particles with methyl methacrylate. However, this process is insufficient in that the weather resistance is drastically degraded in the resulting copolymer resin and discoloration is caused by the presence of the residual emulsifier. There has further been proposed a process in which methyl methacrylate having an unsaturated bond-free elastomer such as an ethylene-vinyl acetate copolymer dissolved therein is suspension-polymerized. In this process, however, the suspension polymerization is difficult to perform and since there is no compatibility between the matrix of polyethyl methacrylate and the elastomer particles, conspicuous bleeding is brought about. Further, no uniform dispersion can be attained when polymethyl methacrylate is blended with such elastomer and good weather resistance inherent of polymethyl methacrylate can not be retained.

We have made extensive and intensive investigations with a view to providing a process which can produce acrylate type resins that will satisfy all of the following requirements:

1. The polymers are excellent in both the wheather resistance and impact resistance.
2. The time required for completion of polymerization is so short that the process can be effectively worked on an industrial scale.
3. The polymers can be subjected directly to such molding treatments as injection molding and extrusion molding.
4. Coloring treatment using a dye or pigment can readily be accomplished.
5. The polymers contain none of impurities, agents used in the polymerization and the like, and molded articles prepared from these polymers have an excellent and beautiful appearance.

As a result we have now completed this invention.

According to the present invention, there is provided a process for the preparation of acrylate type polymers comprising subjecting to suspension-polymerization a system (I) comprising 60 to 100 % by weight based on the system (I) of an alkyl ester of methacrylic acid, 0 to 40 % by weight based on the system (I) of an alkyl ester of acrylic acid and 0 to 10 % by weight based on the system (I) of other vinyl monomercopolymerizable with said esters to obtain a suspension containing polymer beads; and adding to the resulting suspension an aqueous suspension of a system (II) comprising 89 to 99.9 % by weight based on the system (II) of an alkyl ester of acrylic acid, 0.1 to 3 % by weight based on the system (II) of a cross-linking monomer and 0 to 10 % by weight based on the system (II) of an alkyl ester of methacrylic acid, said system (II) being employed in an amount of 20 to 70 parts by weight per 100 parts by weight of said system (I), under agitation at a temperature allowing substantial advance of polymerization to effect a final polymerization.

Preferred examples of the alkyl ester of methacrylic acid to be used in this invention are those having 1 to 4 carbon atoms in the alkyl moiety, such as methyl methacrylate, ethyl methacrylate, n-propyl methacrylate and n-butyl methacrylate. Among them, methyl methacrylate is most preferred. Preferred examples of the alkyl ester of acrylic acid to be used in this invention are those having 1 to 8 carbon atoms in the alkyl moiety, such as methyl acrylate, ethyl acrylate, n-butyl acrylate, isobutyl acrylate, n-hexyl acrylate and 2-ethylhexyl acrylate. Ethyl acrylaate and n-butyl acrylate are most preferred among them. These esters can be used in the form of a mixture of two or more of them. As representative examples of the other vinyl monomers copolymerizable with such esters, there can be mentioned aromatic vinyl compounds such as styrene and α-methylstryrene; vinyl esters of aromatic or aliphatic carboxylic acids such as vinyl acetate and vinyl benzoate; acrylonitrile; and the like.

In the system (I), the incorporation of an alkyl acrylate is useful for improvement of the final polymer in respect of thermal stability, flowability and flexibility. If the amount of the alkyl ester of acrylic acid exceeds 40 % (all of " % " and parts are given by the weight basis throughout the instant specification unless otherwise indicated), a large amount of the polymer sticks to the inner wall of a reaction vessel at the polymerization reaction, resulting in drastic reduction of the production efficiency. The incorporation of other vinyl monomer is useful for reduction of cost. As far as the content of other vinyl monomer is up to 10 % in the system (I), the weather resistance of the resulting polymer is not substantially degraded, but if this content exceeds 10 %, the weather resistance is drastically reduced. Accordingly, most desired results can be obtained when the amount ratio of an aklyl ester of methacrylic acid, an alkyl ester of acrylic acid and other vinyl monomer in the system (I) is within the above-defined range. In practising polymerization of the system (I), as is ordinarily employed, there is employed a polymerization initiator. As the initiator, in this invention, there may preferably be employed free radical polymerization initiators, for example, organic peroxides such as benzoyl peroxide and lauroyl peroxide. In the suspension polymerization of the system (I), it is preferred to control the molecular weight so that an appropriate flowability of the resulting polymer may be obtained. For this purpose, it is most preferred to employ as a chain transfer agent a mercaptan such as n-dodecylmercaptan and n-butylmercaptan. Suspending agents customarily used in the art can be employed in the process of this invention. As the suspending agent to be preferably used in this invention, there can be mentioned, for example, polyvinyl alcohol, potassium polymethyl methacrylate, aluminum hydroxide and barium sulfate.

The suspension-polymerization of the system (I) may be conducted using an aqueous suspension medium, and usually at 60° to 95°C.

In the system (II), the incorporation of an alkyl methacrylate is useful for reduction of cost. If the amount of the alkyl ester of methacrylic acid exceeds 10 %, the elastomeric characteristics are lost and the final polymer if poor in elasticity and softness. As a result, the impact resistance of the final product is lowered. When 0.1 to 3 % of a cross-linking monomer is contained in the system (II), the polymer of the system (II) is lightly cross-linked and the anti-blocking property and toughness of the final polymer can be highly improved. Bifunctional and trifunctional monomers and monomers having a further high functionality can be used in this invention as the cross-linking monomer. More specifically, sufficient results can be obtained when polyethylene glycol (molecular weight 100 to 500) diacrylate, polyethylene glycol (molecular weight 100 to 500) dimethacrylate, diallyl phthalate, divinylbenzene ethylene glycol diacrylate, ethylene glycol dimethacrylate and the like are employed as the cross-linking agent. No substantial cross-linking effect is obtained if the amount of the cross-linking monomer is smaller than 0.1 %. In contrast, if the amount of the cross-linking monomer exceeds 3 %, the elastomeric properties are lost and the polymer becomes brittle. Accordingly, most desirable results are obtained when the amount ratio of an alkyl ester of methacrylic acid, an alkyl ester of acrylic acid and a cross-linking monomer is within the above-defined range. In the final polymerization step, the same polymerization initiator and chain transfer agent as mentioned above with respect to the polymerization of the system (I) are preferably employed.

In the process of this invention, it is indispensable that when the system (II) is added to the suspension containing polymer beads prepared from the system (I), it is added not in the form of a simple mixture but in the form of an aqueous suspension. Illustratively stated, the system (II) is suspended in an aqueous medium by employing a suitable suspending agent and then the suspension is added to the suspension of the polymer beads. By adopting this procedure, even if the mixing of the system (II) with the polymer beads prepared from the sytem (I) is conducted at a temperature allowing substantial advance of polymerization, uniform beads are formed, and good polymers intended in this invention can be obtained.

If the system (II) is added in the form of a simple mixture or in the form of a solution, reduction in the impact resistance of the final polymer is extremely large. Even when the system (II) is added in the form of an aqueous suspension to the suspension of the polymer beads prepared from the system (I), if the addition is effected at a low temperature not allowing substantial advance of polymerization and, after the polymer beads from the system (I) have been impregnated and swollen with system (II), the temperature is elevated to complete polymerization, the polymerization operation becomes complicated and it takes a long time to complete the polymerization reaction. Thus, the process is not suitable for working on an industrial scale. Furthermore, in such case, the impact resistance of the final polymer is lowered, and the resulting beads are poor in compatibility with a dye or pigment and hence, a uniform dispersion of the dye or pigment and the beads cannot be obtained even if the mixing is conducted employing a tumbler. Therefore, it is very difficult to colour the resulting polymer beads.

If the system (II) is employed in an amount less than 20 parts per 100 parts of the system (I), the final polymer is poor in impact resistance and hence, brittle. On the other hand, if the system (II) is employed in an amount more than 70 parts per 100 parts of the system (I), the temperature of thermal deformation of the final polymer is extremely low. The final polymer can not be practically used. Thus, it is requisite to this invention that the weight ratio of the system (I) to the system (II) is 100/20 to 70.

In the process of this invention, the system (II) is added to the polymer formed from the system (I) at a temperature allowing substantial advance of polymerization. By this temperature is meant such a temperature as will attain a polymerization rate of at least 2 % per hour. From a view point of economic rate of polymerization reaction, there may be employed such a temperature as will attain a polymerization rate of about 150 to 250 % per hour. Usually, 60 to about 95°C. may be employed.

The polymerization of the system (I) and the second stage are effected under sealing.

After completion of the polymerization, polymer beads are isolated from the suspension according to a known customary method, washed with pure water, and dehydrated, followed by drying. The resulting polymer is excellent in weather resistance and impact resistance and has good moldability. The polymer is suitable especially for formation of films, and lustrous transparent films can easily be prepared from this polymer according to the inflation molding method or T-die molding method using an ordinary extruder. The polymer obtained according to the process of this invention can be injection-molded or extrusion-molded conveniently. Further, since the polymer is prepared by suspension polymerization, it has a high purity and is free of such discoloration as frequently caused by impurities in polymers formed by emulsion polymerization. Therefore, the polymer can be coloured clearly. Moreover, the polymer prepared according to the process of this invention can be used for modification of other polymers inferior in weather resistance and impact resistance, such as polyvinyl chloride.

This invention will now be illustrated in more detail by reference to the following examples, which by no means limit the scope of this invention.

EXAMPLE 1

1 Part of polyvinyl alcohol (having a molecular weight of 2000) and 0.1 part of sodium dodecylbenzenesulfonate were added to 150 parts of pure water, and the mixture was agitated to dissolve them in water completely. Polymerization was conducted by employing the resulting aqueous suspension medium in the manner as follows.

50 Parts of methyl methacrylate was mixed with 20 parts of methyl acrylate, whereupon 0.21 part of lauroyl peroxide and 0.18 part of n-dodecylmercaptan were added. The mixture was agitated to form a solution. The so formed solution was added to 105 parts of the above aqueous suspension medium and air in the polymerization vessel was substituted by nitrogen while agitating the mixture to keep the suspension state. The contents of the vessel were heated externally with hot water to maintain the temperature at 75°C. and polymerization was conducted at this temperature for 2 hours, whereby a suspension containing polymer beads was obtained. Then, a solution of 0.09 part of lauroyl peroxide and 0.1 part of ethylene glycol diacrylate in 30 parts of ethyl acrylate was suspended in the remaining 45 parts of the above aqueous suspension medium, and the suspension was thrown into the above beads-containing suspension. While the agitation was continued at a temperature maintained at 75°C., the second stage polymerization was conducted for 40 minutes. In order to complete the polymerization, the temperature was then elevated to 95°C. and this temperature was maintained for 2 hours. Then, the resulting polymer was washed sufficiently with warm water and dried to obtain desired polymer beads, which were then fed to an ordinary screw extruder to form them into pellets.

The resulting polymer had an appropriate flowability and could be injection-molded and extrusion-molded. Films molded from this polymer exhibited especially excellent properties. More specifically, when the polymer was fed to an ordinary film-producing apparatus of the T-die type, a film having a thickness of 100 μ could easily be obtained. The resulting film was colorless and transparent, and had a beautiful luster. Main mechanical properties of the so formed film are shown in Table 1. This film was characterized by very high weather resistance. More specifically, even after the film was subjected to the exposure test by employing a weather-o-meter including a xenon arc lamp of 6000 W for a period as long as 2,000 hours, the appearance of the film did not change at all.

| System (I): | | |
|---|---|---|
| methyl methacrylate | 60 | parts |
| ethyl acrylate | 20 | parts |
| lauroyl peroxide | 0.24 | part |
| n-dodecylmercaptan | 0.21 | part |
| System (II): | | |
| n-butyl acrylate | 20 | parts |
| lauroyl peroxide | 0.06 | part |
| polyethylene glycol dimethacrylate (the polyethylene glycol portion having a molecular weight of 200) | 0.1 | part |

A film was prepared by employing the so obtained polymer in the same manner as in Example 1. The resulting film was colorless and transparent and had a beautiful luster as the film obtained in Example 1. This film was similarly excellent in the machanical strength and weather resistance.

EXAMPLE 3

A polymer was prepared in the same manneer as in Example 1 by employing the following systems (I) and (II).

| System (I): | | |
|---|---|---|
| methyl methacrylate | 42 | parts |
| methyl acrylate | 12 | parts |
| acrylonitrile | 6 | parts |
| lauroyl peroxide | 0.18 | part |
| n-dodecylmercaptan | 0.15 | part |
| System (II): | | |
| methyl methacrylate | 2 | parts |
| n-butyl acrylate | 38 | parts |
| divinylbenzene | 0.05 | part |
| lauroyl peroxide | 0.12 | part |

When the resulting polymer was molded into a film in the same manner as in Example 1, a faintly yellow Table 1

| | Mechanical Properties of Film obtained in Example 1 | | | |
|---|---|---|---|---|
| Item | Test Method | Unit | Extrusion Direction | Lateral Direction |
| Tensile yield strength | ASTM D-882 | Kg/cm$^2$ | 320 | 220 |
| Tensile strength at break | ASTM D-882 | Kg/cm$^2$ | 260 | 220 |
| Elongation at break | ASTM D-882 | % | 125 | 72 |
| Initial tensile modulus | ASTM D-882 | Kg/cm$^2$ | 19000 | 11000 |
| Tear strength | ASTM D-1938 | g/100 μ | 19.4 | 29.0 |
| Punching impact strength | * | Kg-cm/100 μ | 8.3 | 12.2 |

* measured by employing a film impact tester manufactured and sold by Toyo Seiki Kabushiki Kaisha, Japan

EXAMPLE 2

A polymer was prepared in the same manner as in Example 1 by employing the following systems (I) and (II).

transparent film having a beautiful luster was obtained. The mechanical properties of the so formed film are shown in Table 2. When the film was subjected to the exposure test in the same manner as in Example 1, it was found that the weather resistance of the film was as good as that of the film obtained in Example 1.

Table 2

| | Mechanical Properties of Film obtained in Example 3 | | | |
|---|---|---|---|---|
| Item | Test Method | Unit | Extrusion Direction | Lateral Direction |
| Tensile yield strength | ASTM D-882 | Kg/cm$^2$ | 300 | 210 |
| Tensile strength at break | ASTM D-882 | Kg/cm$^2$ | 250 | 210 |
| Elongation at break | ASTM D-882 | % | 115 | 64 |

Table 2-continued

| Item | Mechanical Properties of Film obtained in Example 3 | | | |
|---|---|---|---|---|
| | Test Method | Unit | Extrusion Direction | Lateral Direction |
| Initial tensile modulus | ASTM D-882 | Kg/cm$^2$ | 15000 | 10000 |
| Tear strength | ASTM D-1938 | g/100 μ | 18.3 | 27.8 |
| Punching impact strength | * | Kg-cm/100 μ | 6.7 | 9.1 |

* measured by employing a film impact tester manufactured and sold by Toyo Seiki Kabushiki Kaisha, Japan

EXAMPLE 4

1.5 Parts of aluminum sulfate was added to 120 parts of pure water and completely dissolved therein by agitation. Then, 30 parts of a 10 % aqueous solution of sodium carbonate was added to the solution to form fine particles of aluminum hydroxide. The thus obtained aqueous solution was employed as a suspension medium for conducting a suspension-polymerization. Employing the same systems as employed in Example 1, the suspension-polymerizations were conducted in the same manner as in Example 1. After completion of the whole polymerization procedures, the resulting reaction mixture was cooled to room temperature and sulfuric acid was added thereto to dissolve the aluminum hydroxide. Polymer beads were recovered by filtration, washed several times with pure water and dried. Then, in the same manner as in Example 1, the polymer beads were pelletized by a screw extruder and molded into a film. The resulting film was quite similar to the film obtained in Example 1 with respect to the appearance, mechanical properties and weather resistance.

COMPARATIVE EXAMPLE 1

In the same manner as in Example 1, polymerization was carried out by employing the same monomer mixtures, namely the same systems (I) and (II), and the same suspension medium as used in Example 1, except that the second stage polymerization procedures were changed as follows:

The suspension obtained at the first stage polymerization, which contained beads of a methyl methacrylate-methyl acrylate copolymer, was cooled to room temperature, and a solution of 0.09 part of lauroyl peroxide and 0.1 part of ethylene glycol diacrylate in 30 parts of ethyl acrylate was added, at a time, to the suspension. The mixture was agitated for 3 hours to impregnate and swell the polymer beads with the monomers, and the temperature was elevated to 75°C. and this temperature was maintained for 40 minutes to effect the second stage polymerization. In order to complete the reaction, the temperature was elevated to 95°C. and this temperature was maintained for 2 hours, whereupon the suspending agent was separated and the resulting polymer was washed.

The time required for completion of the first stage and second stage polymerization steps was 9 hours 10 minutes, while this time was 5 hours and 15 minutes in Example 1. Thus, in this Comparative Example 1, the time required for completion of the polymerization was prolonged by 75 % as compared with that in Example 1.

In the same manner as in Example 1, the resulting polymer was pelletized by a screw extruder and molded into a film. Although the resulting film was colorless and transparent and had a beautiful luster, reduction of the impact resistance was observed, and the punching impact strength of the film was only one-half of that of the film obtained in Example 1.

COMPARATIVE EXAMPLE 2

The polymerization was conducted in the same manner as in Example 1 except that all of 150 parts of the aqueous suspension medium was used at the first stage polymerization and the monomeric mixture or system (II) was directly added at the second stage polymerization without suspending it in the aqueous suspension medium. The resulting polymer was molded into a film in the same manner as in Example 1. Although the resulting film was colorless and transparent and had a beautiful luster, the punching impact strength was as low as one-third to one-fourth of the punching impact strength of the film obtained in Example 1.

COMPARATIVE EXAMPLE 3

The substantially same procedures as in Example 1 were repeated except that the composition of the monomeric mixture or system (I) was changed as follows:

```
System (I):
    methyl methacrylate      40     parts
    methyl acrylate          30     parts
    lauroyl peroxide         0.21   part
    n-dodecylmercaptan       0.18   part
```

During the polymerization, scales, which were not formed in Example 1, were formed and sticked in large quantities to the vessel wall. Therefore, it was difficult to conduct the polymerization operation stably.

COMPARATIVE EXAMPLE 4

The substantially same procedures as in Example 3 were repeated except that the composition of the monomeric mixture or system (I) was changed as follows:

```
System (I):
    methyl methacrylate      42     parts
    methyl acrylate           8     parts
    acrylonitrile            10     parts
    lauroyl peroxide         0.18   part
    n-dodecylmercaptan       0.15   part
```

When the resulting polymer was formed into a film in the same manner as in Example 1, a yellow and transparent film having a luster was obtained. When the film was subjected to the exposure test in the same manner as in Example 1, it was found that the film was drastically discolored in brown by 200 hours' exposure to the weather-o-meter.

COMPARATIVE EXAMPLE 5

The substantially same procedures as in Example 3 were repeated except that the composition of the monomeric mixture or system (II) was changed as follows:

```
System (II):
    methyl methacrylate        10      parts
    n-butyl acrylate           30      parts
    divinylbenzene             0.05    part
    lauroyl peroxide           0.12    part
```

A film prepared from the resulting polymer in the same manner as in Example 1 was poor in softness and elasticity, and each of the elongation at break and punching impact strength was reduced to one-fifth to one-sixth of that of the film obtained in Example 3. Accordingly, the film had no practical utility.

COMPARATIVE EXAMPLE 6

The substantially same procedures as in Example 1 were repeated except that ethylene glycol diacrylate as the cross-linking monomer was not used.

A film prepared from the resulting polymer in the same manner as in Example 1 was inferior to the film obtained in Example 1 with respect to the toughness, and it was likely to tear. The anti-blocking property of the films obtained in this Comparative Example and Example 1 was tested according to the following test method:

A. Test Method

The film was cut into 20 mm × 50 mm, and two sheets of the thus obtained specimens were piled so that they overlapped each other in an area of 5 cm² and the assembly was allowed to stand under a pressure of 800 g/cm² at a temperature of 70°C. for 2 hours. Then, the asembly was cooled and subjected to a tensile tester to determine the peeling load.

B. Test Results

In the case of the film obtained in Example 1, the two specimens were peeled from each other under a load of about 30 g/cm, whereas in the case of Comparative Film 6, the assembly was broken and peeling was impossible.

COMPARATIVE EXAMPLE 7

The substantially same procedures as in Example 1 were repeated except that the amount of ethylene glycol diacrylate as the cross-linking monomer was increased to 1.2 parts.

A film prepared from the resulting polymer in the same manner as in Example 1 was poor in softness and elasticity, and its punching impact strength was as low as one-fifth to one-sixth of the punching impact strength of the film obtained in Example 1.

COMPARATIVE EXAMPLE 8

The substantially same procedures as in Example 1 were repeated except that the composition of system (II) was changed as follows:

```
System (II):
    ethyl acrylate             12      parts
    ethylene glycol diacrylate 0.04    part
    lauroyl peroxide           0.04    part
```

A film prepared from the resulting polymer in the same manner as in Example 1 was poor in softness and elasticity, and its punching impact strength was as low as one-tenth of the punching impact strength of the film obtained in Example 1. Accordingly, it had no practical utility.

COMPARATIVE EXAMPLE 9

The substantially same procedures as in Example 1 were repeated except that the composition of the system (II) was changed as follows:

```
System (II):
    ethyl acrylate             53      parts
    ethylene glycol diacrylate 0.18    part
    lauroyl peroxide           0.16    part
```

A film prepared from the resulting polymer in the same manner as in Example 1 easily shrunk only when it was heated at 50°C. Accordingly, it had no practical utility. Properties of films prepared from the polymers obtained in Comparative Examples 1 to 9 are collectively shown in Table 3.

Table 3

Properties of Films obtained in Comparative Examples

| Comparative Example No. | Properties | |
|---|---|---|
| 1 | punching impact strength in extrusion direction : | 4.0 Kg-cm/100 μ |
|   | punching impact strength in lateral direction : | 6.3 Kg-cm/100 μ |
| 2 | punching impact strength in extrusion direction : | 3.1 Kg-cm/100 μ |
|   | punching impact strength in lateral direction : | 5.8 Kg-cm/100 μ |
| 3 | scales sticked to the vessel wall and screw, the total amount of the scales was 15 parts, and it took 3 hours to scrape the scales. | |
| 4 | film was made opaque and discolored into dark from under 200 hours' exposure to weather-o-meter. | |
| 5 | elongation at break in extrusion direction : | 20 % |
|   | elongation at break in lateral direction : | 11 % |
|   | punching impact strength in extrusion direction : | 1.2 Kg-cm/100 μ |
|   | punching impact strength in lateral direction : | 1.7 Kg-cm/100 μ |
| 6 | at the anti-blocking test, the film was broken and peeling was impossible. | |
| 7 | punching impact strength in extrusion direction : | 1.4 Kg-cm/100 μ |
|   | punching impact strength in lateral direction : | 2.2 Kg-cm/100 μ |
| 8 | punching impact strength in extrusion direction : | 0.7 Kg-cm/100 μ |
|   | punching impact strength in lateral direction : | 1.1 Kg-cm/100 μ |
| 9 | film shrunk by 20 % at 50°C., while film of Example 1 did not shrink at 80°C. | |

EXAMPLE 5

Into 85 parts of the polymer obtained in Example 1 was added 15 parts of commercially available titanium oxide powders, and they were blended for 15 minutes by means of a drum type tumbler. The mixture was fed to a screw type extruder and pelletized, and the pellets were molded into a film. The resulting film was white and opaque and had a luster on the surface. It was found that titanium oxide was uniformly dispersed.

COMPARATIVE EXAMPLE 10

In the same manner as in Example 5, the titanium oxide powders were incorporated into the polymer obtained in Comparative Example 1, and pelletized. In a film prepared from the resulting mixture, uniform dispersion of titanium oxide was not attained and the surface was rough with no luster.

As described, according to the process of the present invention, there can be produced acrylate type polymers having in combination an excellent weather resistance and a high impact resistance. In the conventional process utilizing the emulsion-polymerization technique, it is impossible to remove completely the employed emulsifier at the purification step and hence, the resulting polymer is impure. Further, in the conventional process utilizing the suspension-polymerization technique, it is possible to obtain a pure polymer, but the process involves difficulties in preparing an elastomer of fine particles. In contrast, in the process of this invention, by dividing the suspension-polymerization process into two stages and conducting these two stages of the polymerization under specific conditions, it is made possible to produce impact-resistant acrylate polymers having excellent properties effectively at a high efficiency on an industrial scale.

What is claimed is:

1. A process for preparing acrylate polymers which comprises suspension-polymerizing a system (I) comprising 60 to 100% by weight based on the system (I) of an alkyl ester of methacrylic acid, 0 to 40% by weight based on the system (I) of an alkyl ester of acrylic acid and 0 to 10% by weight based on the system (I) of other vinyl monomers copolymerizable with said esters to obtain a suspension containing polymer beads; and adding to the resulting suspension an aqueous suspension of a system (II) comprising 89 to 99.9% by weight based on the system (II) of an alkyl ester of acrylic acid, 0.1 to 3% by weight based on the system (II) of a cross-linking monomer and 0 to 10% by weight based on system (II) of an alkyl ester of methacrylic acid, said system (II) being employed in an amount of 20 to 70 parts by weight per 100 parts by weight of said system (I), under agitation at a temperature allowing substantial advance of polymerization and thereafter effecting complete polymerization.

2. A process according to claim 1 wherein the alkyl ester of methacrylic acid is one having 1 to 4 carbon atoms in the alkyl moiety.

3. A process according to claim 1 wherein the alkyl ester of methacrylic acid is methyl methacrylate.

4. A process according to claim 1 wherein the alkyl ester of acrylic acid is one having 1 to 8 carbon atoms in the alkyl moiety.

5. A process according to claim 1 wherein the alkyl ester of acrylic acid is ethyl acrylate or n-butyl acrylate.

6. A process according to claim 1 wherein said other vinyl monomer is a member selected from the group consisting of an aromatic vinyl compound, a vinyl ester of an aromatic or aliphatic carboxylic acid and acrylonitrile.

7. A process according to claim 1 wherein the cross-linking monomer is a member selected from the group consisting of polyethylene glycol diacrylate, polyethylene glycol dimethacrylate, diallyl phthalate, divinylbenzene, ethylene glycol diacrylate and ethylene glycol dimethacrylate.

8. A process according to claim 1 wherein the suspension-polymerization of the system (I) is conducted at a temperature of 60° to 95°C.

9. A process according to claim 1 wherein the final polymerization is conducted at a temperature of 60° to 95°C.

10. The process of claim 1 wherein the suspension-polymerization of system (I) is carried out substantially to completion.

* * * * *